United States Patent [19]

Muraoka

[11] Patent Number: 5,802,120
[45] Date of Patent: Sep. 1, 1998

[54] RECEPTION CIRCUIT FOR A BASEBAND PROCESSING AND OPERATION

[75] Inventor: Shinya Muraoka, Tokyo, Japan

[73] Assignee: NEC Corporation, Tokyo, Japan

[21] Appl. No.: 359,578

[22] Filed: Dec. 20, 1994

[30] Foreign Application Priority Data

Dec. 28, 1993 [JP] Japan .................. 5-350400

[51] Int. Cl.$^6$ .................. H04L 7/033; H04L 27/38; H04L 7/08; H04J 3/06
[52] U.S. Cl. .................. 375/362; 375/285; 375/296; 370/509
[58] Field of Search .................. 375/357, 362, 375/344, 354, 365, 285, 296; 370/503, 509

[56] References Cited

U.S. PATENT DOCUMENTS 4,398,291  8/1983  Hotta et al. .................. 370/323
4,615,040  9/1986  Mojoli et al. .................. 375/40
5,592,518  1/1997  Davis et al. .................. 375/368

FOREIGN PATENT DOCUMENTS 5-316387  5/1992  Japan .

*Primary Examiner*—Wellington Chin
*Assistant Examiner*—Jean B. Corrielus
*Attorney, Agent, or Firm*—Laff, Whitesel, Conte & Saret, Ltd.

[57] ABSTRACT

In a reception circuit, a frame status signal indicating whether frame synchronization is established is output from a frame synchronizing circuit to a frame counter circuit. When the frame synchronization is established, a timing signal synchronized with a reception frame pulse is output from the frame counter circuit. When the frame synchronization is not established or out of synchronization, a built-in frame counter is operated in a flywheel mode to output a timing signal to synchronize a baseband circuit and an I/F buffer circuit, so that communication with an external circuit can be kept normal irrespective of presence or absence of frame synchronization.

8 Claims, 4 Drawing Sheets

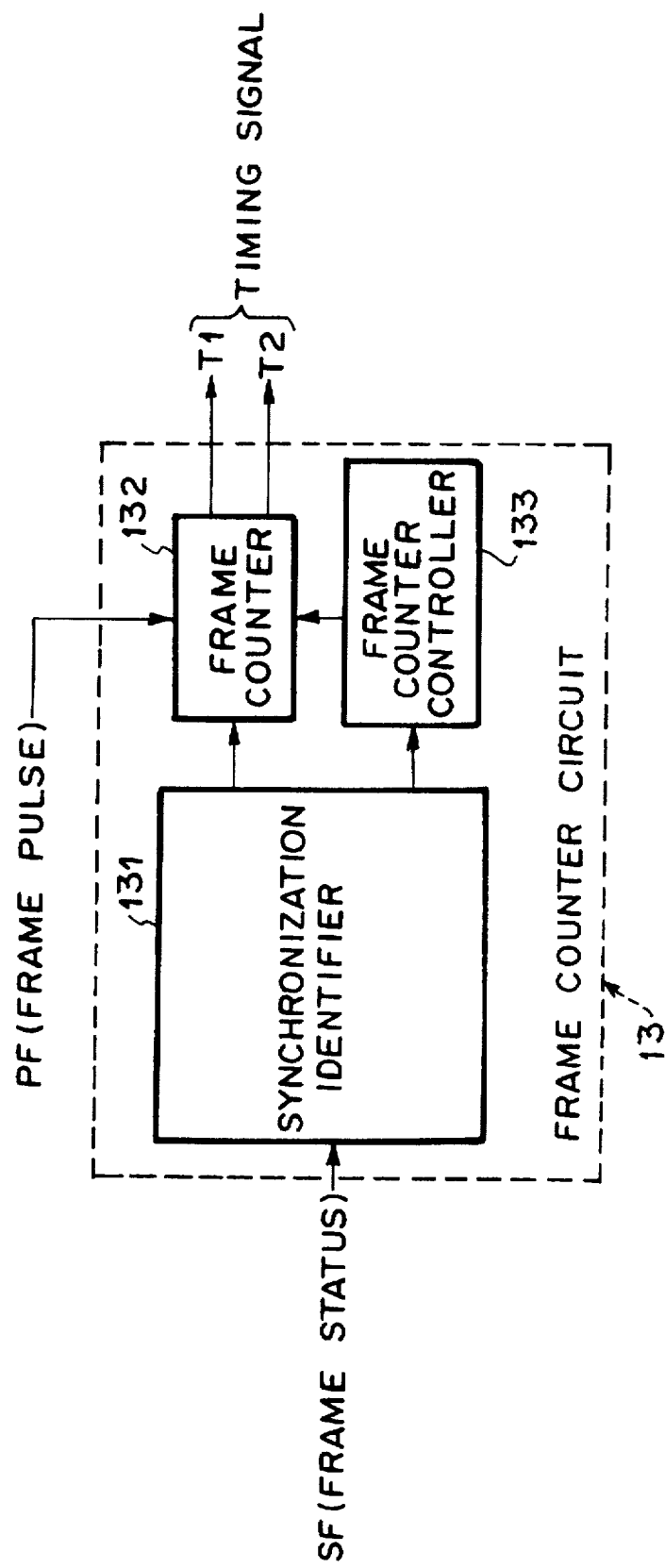

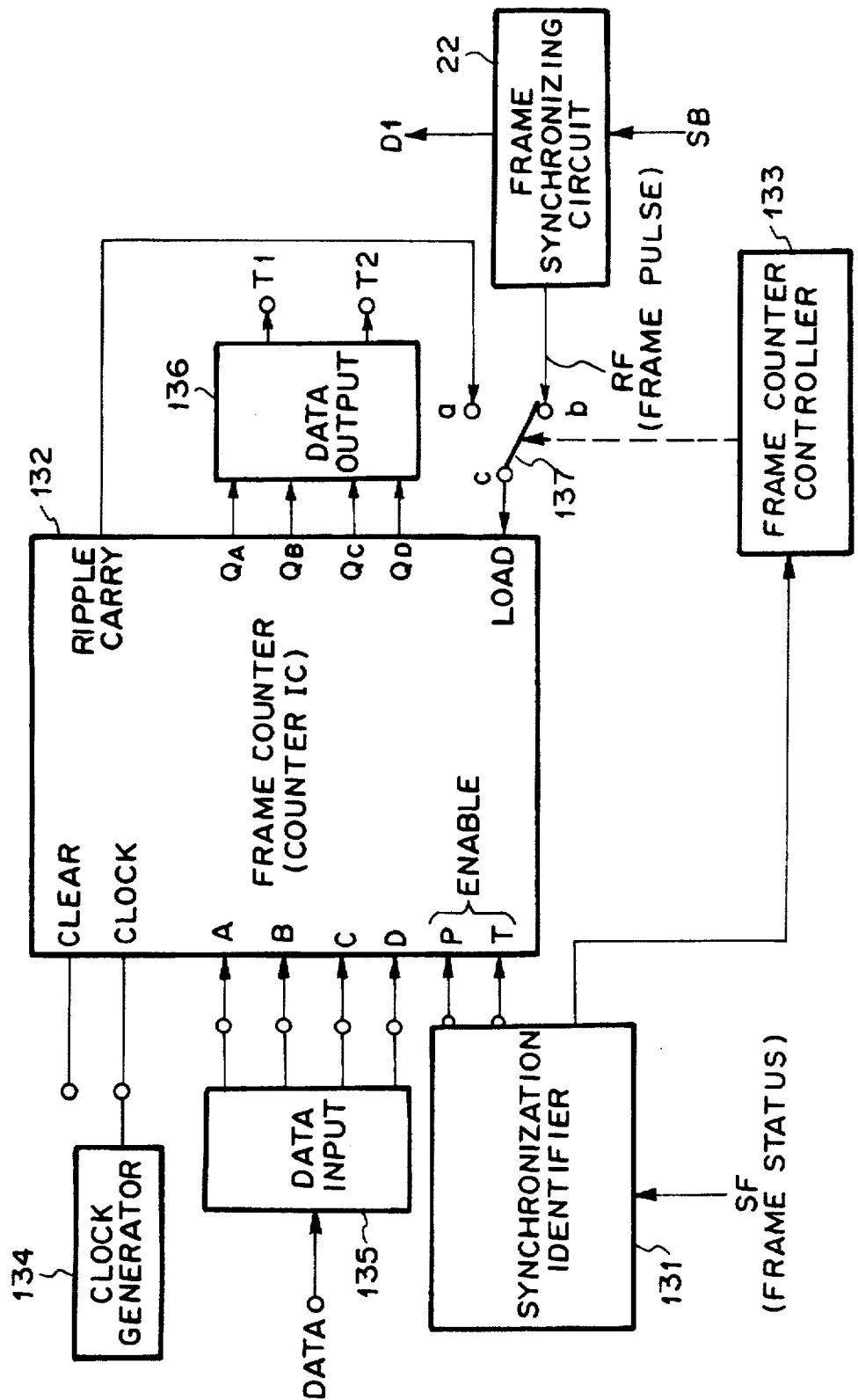

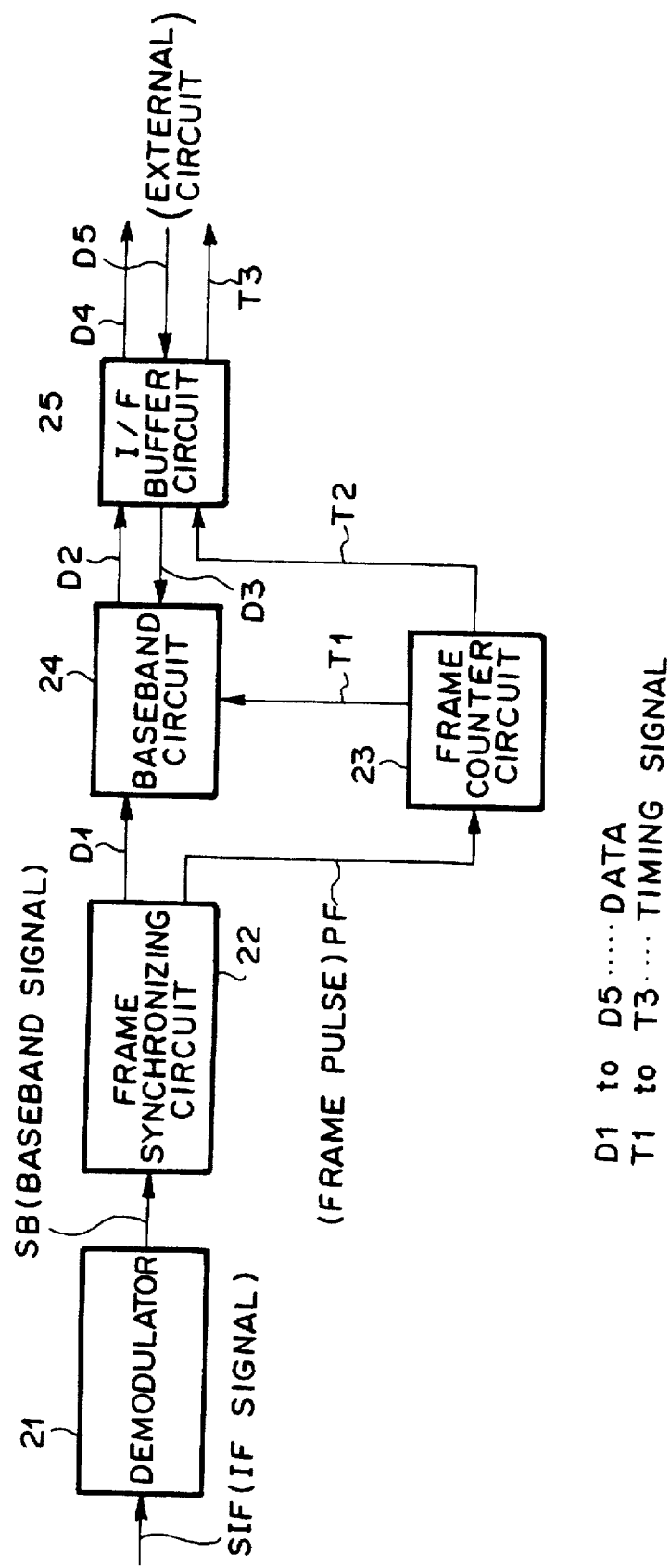

RECEPTION CIRCUIT FOR A BASEBAND PROCESSING AND OPERATION

BACKGROUND OF THE INVENTION

1. Field of the Invention

This invention relates to a reception circuit for use in a digital satellite communication system, and particularly to a reception circuit for use in a system for performing a baseband processing for received signals and a data reception and transmission operation from and to an external circuit in synchronism with a reception frame.

2. Description of Related Art

FIG. 4 is a block diagram showing one of conventional reception circuits. In FIG. 4, the reception circuit is supplied with IF signals SIF. The IF signals SIF are obtained as follows. At a transmission side, digital signals are subjected to various kinds of coding operations in synchronism with a transmission frame, and then transmitted while high-frequency components thereof are modulated. The modulated high-frequency signals are received at a reception side, and converted to signals in an IF (intermediate frequency) band (hereinafter referred to as "IF signals"). Here, data reception and transmission from and to an external circuit is assumed to be performed in synchronism with a timing signal T3 shown in FIG. 4.

As shown in FIG. 4, the input IF signals SIF are demodulated to signals in a baseband (hereinafter referred to as "baseband signals") SB in a demodulator (DEM) 21. The demodulated baseband signals SB are supplied to a frame synchronizing circuit 22 to establish frame synchronization therefor. The frame synchronizing circuit 22 outputs frame pulses PF to a frame counter circuit 23, and also outputs to a baseband circuit 24 data D1 which are synchronized with the frame pulse PF and have been already established in frame synchronization. The frame counter circuit 23 contains a frame counter, and actuates the frame counter in synchronism with the input frame pulses PF to generate various kinds of timing signals. For example, the frame counter circuit 23 outputs a timing signal T1 and a timing signal T2 to the baseband circuit 24 and an interface buffer (hereinafter referred to as "I/F buffer") circuit 25, respectively.

In the baseband circuit 24, the data D1 supplied from the frame synchronizing circuit 22 are decoded, for example, according to a prescribed data format in synchronism with the timing signal T1 supplied from the frame counter circuit 23, and output the decoded data as data D2 to an I/F buffer circuit 25. In addition, the baseband circuit 24 receives data D3 which are obtained by converting the format of data D5 supplied from another external circuit to execute a desired processing on the data D3. The I/F buffer circuit 25 converts the format of the data D2 input from the baseband circuit 24 in synchronism with the timing signal T2, and then outputs to an external circuit (a circuit different from the reception circuit) the timing signal T3 and data D4 which are synchronized with the timing signal T3. In addition, the I/F buffer circuit 25 converts the format of the data D5 from the external circuit and then outputs the data D3 to the baseband circuit 24.

Since the reception and transmission of signals from and to the external circuit are performed in synchronism with the timing signals T1 and T2 from the frame counter circuit 23 in such a conventional reception circuit, the frame pulses PF may be input at an erroneous interval from the frame synchronizing circuit 22 to the frame counter circuit 23 (1) when the frame counter circuit 23 is synchronized with the reception frame at the demodulation time of the IF signals SIF, (2) when the frame synchronization has not yet been established in the frame counter circuit 23, or (3) when the frame counter circuit 23 is out of the frame synchronization. Therefore, there is a possibility that abnormal timing signals T1 and T2 would be output from the frame counter circuit 23 and thus no normal communication could not be performed with the external circuit. Likewise, when the frame synchronizing circuit 22 itself is out of order and thus it is not normally operated, the communication with the external circuit is also disturbed.

SUMMARY OF THE INVENTION

An object of the present invention is to provide a reception circuit which is capable of keeping its normal communication with an external circuit at all times irrespective of any synchronization status such as a frame-synchronization established status, a frame-synchronization unestablished status and an out-of-frame-synchronization status.

In order to attain the above object, a reception circuit according to the present invention includes a demodulation circuit for demodulating to baseband signals digital IF signals which are subjected to various kinds of codings, a frame synchronizing circuit for establishing frame synchronization for the baseband signals and outputting a frame status signal indicating whether the frame synchronization is established, frame pulses and data which are synchronized with the frame pulses and for which the frame synchronization has been already established, a frame counter circuit for detecting the frame status signal supplied from the frame synchronizing circuit to actuate a built-in frame counter in synchronism with the supplied frame pulse when the frame synchronization is established or actuate the frame counter in a flywheel operation to generate various kinds of timing signals when no frame synchronization is established, a baseband circuit for decoding the baseband signals from the frame synchronizing circuit in synchronism with the timing signal from the frame counter circuit or receiving data which are input from an external circuit and is converted in format, thereby executing a prescribed processing on the data, and an interface buffer for converting the format of the data from the baseband circuit in synchronism with the timing signal from the frame counter circuit and outputting the format-converted data to the external circuit, or converting the format of the data from the external circuit and outputting the format-converted data to the baseband circuit.

The frame counter circuit includes means for detecting on the basis of the frame status signal whether the frame synchronization is established, means for generating timing signals on the basis of the frame pulses at the synchronization time and means for operating the frame counter in a flywheel mode at the non-synchronization time.

According to the reception circuit, the frame counter circuit is synchronized with the reception frame pulse when the frame synchronization is established, and it is operated in the flywheel mode when the frame synchronization is not established or when the frame counter circuit is out of frame synchronization. Therefore, the communication with the external circuit can be kept normally at all times in any synchronization status.

BRIEF DESCRIPTION OF THE DRAWINGS

FIG. 2 is a functional block diagram showing a frame counter circuit;

FIG. 3 is a block diagram showing an operation of the reception circuit when a frame counter is operated in a flywheel mode; and FIG. 4 is a block diagram showing a conventional reception circuit.

DETAILED DESCRIPTION OF THE PREFERRED EMBODIMENT

Figure 1:
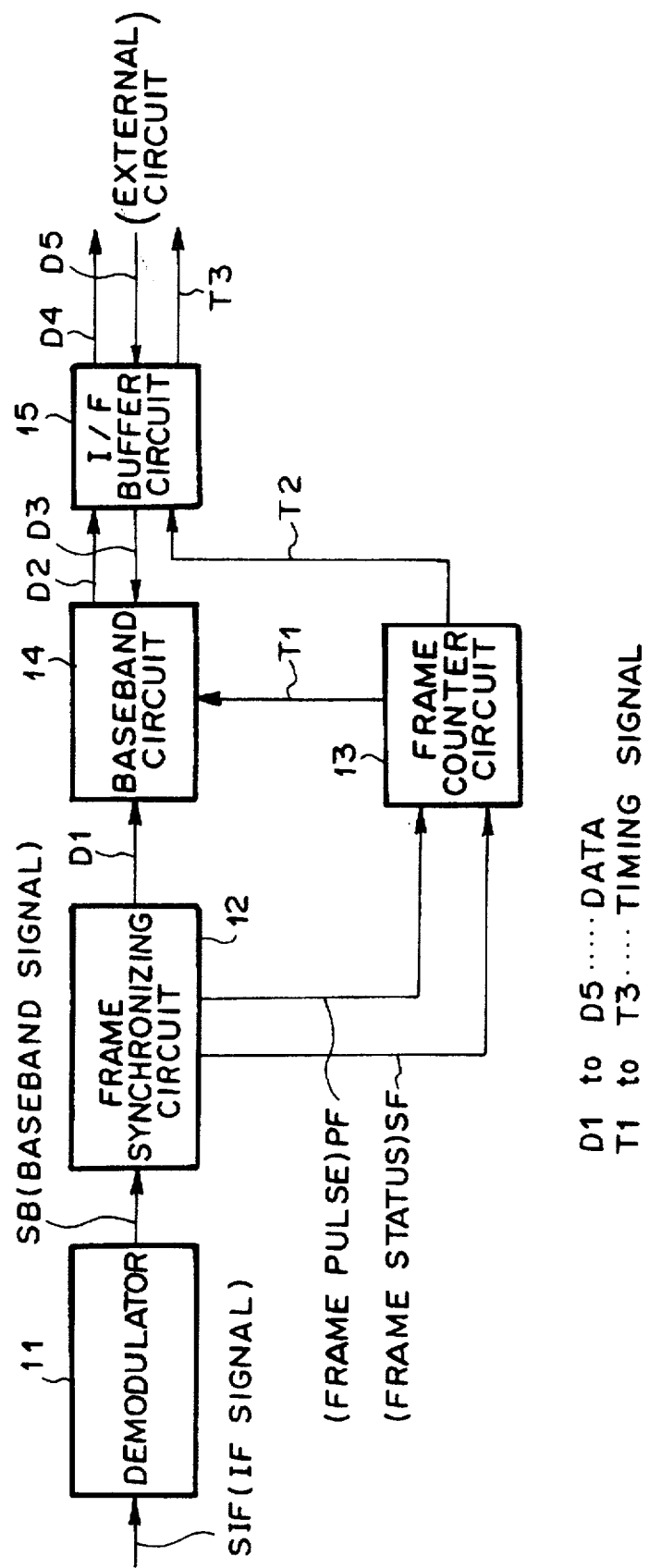
FIG. 1 is a block diagram showing a reception circuit of an embodiment according to this invention.

A preferred embodiment according to the present invention will be described hereunder with reference to the accompanying drawings.

FIG. 1 is a block diagram showing a reception circuit of an embodiment according to this invention, and the same elements as the conventional reception circuit are represented by the same reference numerals.

In FIG. 1, the demodulation circuit (DEM) 11 demodulates the IF signals SIF to the baseband signals SB. As described above, the digital signals are subjected to the various kinds of coding operations in synchronism with the transmission frame, and then converted to the signals in the IF (intermediate frequency) band to obtain the IF signals SIF. The frame synchronizing circuit 12 establishes the frame synchronization for the demodulated baseband signals SB, and outputs the frame status signal SF indicating whether the frame synchronization is established, the frame pulse PF and the data D1 which are synchronized with the frame pulse PF and for which the frame synchronization has been already established. The frame counter circuit 13 outputs the timing signals T1 and T2 on the basis of the frame pulses PF and the frame status signal SF.

The baseband circuit 14 decodes the data D1 from the frame synchronizing circuit 12 in synchronism with the timing signal T1 from the frame counter circuit 13. Further, the baseband circuit 14 receives the data D3 which are obtained by converting the format of the data D5 input from an external circuit, and executes a prescribed processing on the data D3. For example, the baseband circuit 14 may receive deciphering (decoding) data D3 of a prescribed format to execute a descrambling processing on scrambled data D1 on the basis of the decoding data D3. The I/F buffer circuit 15 converts the format of the data D2 from the baseband circuit 14 in synchronism with the timing signal T2 from the frame counter circuit 13 and outputting the format-converted data D2 to the external circuit as the data D4. Further, the I/F buffer circuit 15 also converts the format of the data D5 from the external circuit and outputting the format-converted data D5 to the baseband circuit 14 as the data D3.

As shown in a functional block of FIG. 2, the frame counter circuit 13 includes a synchronization identifier 131 for detecting the frame status signal SF supplied from the frame synchronizing circuit 12 to identify a synchronization status, a frame counter 132 for outputting timing signals on the basis of the frame pulses PF at the synchronization time (when the frame synchronization is established), and a frame counter controller 133 for controlling the frame counter 132 on the basis of a signal from the synchronization identifier 131 to operate the frame counter 132 in a flywheel mode at the non-synchronization time (when the frame synchronization is established in the frame counter circuit 13 or when the frame counter circuit 13 is out of frame synchronization). Accordingly, the frame counter 132 is operated in synchronism with the supplied frame pulses PF at the time when the frame synchronization is established in the frame counter circuit 13, and operated in the flywheel mode at the time when the frame synchronization is not established or at the out-of-synchronization time, thereby generating various kinds of timing signals.

According to the reception circuit thus constructed, the IF signals SIF input to the demodulator 11 are demodulated to the baseband signals SB. The demodulated baseband signals SB are established in frame synchronization in the frame synchronizing circuit 12, and the frame status signal SF and the frame pulses PF are output from the frame synchronizing circuit 12 to the frame counter circuit 13. The frame synchronizing circuit 12 also outputs to the baseband circuit 14 the data D1 which are synchronized with the frame pulse PF and for which the frame synchronization has been already established.

In the frame counter circuit 13, the input frame status SF is detected by the synchronization identifier 131 to judge whether the frame synchronization is currently established. If the frame synchronization is judged to be established, the frame counter 132 is operated in synchronism with the frame pulses PF to generate and output the timing signals T1 and T2 which are synchronized the frame pulses PF. On the other hand, if the frame synchronization is judged not to be established, the frame counter 132 is operated in the flywheel mode to generate the timing signals T1 and T2 on the basis of clock signals with which the frame counter 132 is operated. Thereafter, the timing signal T1 is supplied to the baseband circuit 14 and the timing signal T2 is supplied to the I/F buffer circuit 15.

The baseband circuit 14 decodes the data D1 input from the frame synchronizing circuit 12 in synchronism with the timing T1, and then outputs the decoded data as the data D2 to the I/F buffer circuit 15. Further, the baseband circuit 14 receives the data D3 to which the data D5 from the external circuit are format-converted, and executes a prescribed processing on the data D3. For example, when data are transmitted from a transmission side while scrambled in a so-called "SKYPORT mode" of scrambling method, it is required to rearrange scanning lines in a formal order. At this time, the data D5 indicates a level in the skyport at which the descrambling operation is performed for a scanning line, and on the basis of the data D5, the data D3 indicates the specific relationship between each scanning line of the transmitted scanning lines and the position at which the scanning line should be arranged, that is, the data D3 indicates which scanning line should be disposed at which position.

The I/F buffer circuit 15 converts the format of the data D2 input from the baseband circuit 14 in synchronism with the timing signal T2, and then outputs the timing signal T3 and the data D4 synchronized with the timing signal T3 to the external circuit. Further, the I/F buffer circuit 15 converts the format of the data D5 from the external circuit, and outputs the data D3 to the baseband circuit. In this case, the timing signals T2 and T3 may be identical to each other, or may be signals which are synchronized with each other.

Accordingly, when the frame synchronization is established in the frame counter circuit 13, the timing signals synchronized with the reception frame pulses are output from the frame counter circuit 13, and the normal communication can be performed with the external circuit. Likewise, when the frame synchronization is not established in the frame synchronizing circuit 12 or when the frame synchronizing circuit 12 is out of frame synchronization, the frame counter 132 is operated in the flywheel mode to output the timing signals which are synchronized with the clock signals thereof. Therefore, the normal communication with the external circuit can be also performed in these states.

The operation of the reception circuit when the frame counter 132 is operated in the flywheel mode will be described hereunder with reference to FIG. 3.

In this case, an C-MOS counter IC of μPD74HC161C type produced by NEC is used as the frame counter. The frame pulses PF are input from the frame synchronizing circuit 22 to a b-terminal of a switch 137. Upon input of the frame pulse PF, the frame counter 132 counts clock signals from a clock generating circuit 134 in accordance with data from a data input unit 135, and outputs timing signals T1 and T2 at a prescribed timing from a data output unit 136. Subsequently, when the synchronization identifier 131 is supplied with a frame status signal SF indicating that the frame synchronization is not established, both of ENABLE terminals of the frame counter 132 are kept in an H-level state and the switch 137 is switched to an a-terminal side by the frame counter controller 133. Through this operation, a LOAD terminal of the frame counter 132 is set to be active every full count of the frame counter 132 to repetitively continue the count operation, whereby the frame counter 132 is operated like the flywheel operation. As a result, the substantially same signals as output when the frame synchronization is established are output as the timing signals T1 and T2 for the data output.

In the above embodiment, the flywheel operation is performed with a hardware. However, this operation may be achieved with a software. Specifically, the clock signal of the clock generating circuit is constant, and by operating the synchronization input signal of the counter in accordance with a program in a microcomputer so that the counter is cleared to start a count operation when the counter is in a full count state, as the result, the counter is operated in the flywheel mode, thereby obtaining desired timing signals T1 and T2.

As described above, according to this invention, the frame status signal indicating whether the frame synchronization is established from the frame synchronizing circuit to the frame counter circuit. If the frame synchronization is established, the timing signals which are synchronized with the reception frame pulses are output from the frame counter circuit, and when the frame synchronization is not established or at the out-of-synchronization time, the frame counter in the frame counter circuit is operated in the flywheel mode to output the timing signal. Therefore, the communication with the external circuit can be kept normal at all times irrespective of the presence or absence of the frame synchronization.

What is claimed is:

1. A reception circuit for receiving digital data, comprising:

a demodulation circuit for demodulating received signals to baseband signals containing a frame signal;

a frame synchronizing circuit for receiving the baseband signals and outputting a frame status signal indicating whether the frame synchronization is established, a frame pulse which is generated every frame signal, and data from the baseband signals;

a frame counter circuit for outputting a plurality of timing signals synchronized with the frame pulse when it is judged on the basis of the frame status signal that the frame synchronization is judged to be established, and outputting a timing signal for performing a flywheel operation on the basis of a clock signal thereof when the frame synchronization is not established; and a baseband circuit for decoding and operating baseband signals from said frame synchronizing circuit in synchronism with timing signals from said frame counter circuit, converting the baseband signals in the frame according to a frame format, receiving data which are input from an external circuit, processing the baseband signals according to the data from the external circuit, and outputting the processed baseband signals; and an interface buffer for converting the format of data from said baseband circuit in synchronism with one of the timing signals and outputting the format-converted data as format data.

2. A reception circuit, for receiving digital data, comprising:

a demodulation circuit for demodulating received signals to baseband signals containing a frame signal;

a frame synchronizing circuit for receiving the baseband signals and outputting a frame status signal indicating whether the frame synchronization is established, a frame pulse which is generated every frame signal, and data from the baseband signals;

a frame counter circuit for outputting a timing signal synchronized with the frame pulse when it is judged on the basis of the frame status signal that the frame synchronization is judged to be established, said frame counter circuit carrying out a flywheel operation for inputting a ripple carry signal of said frame counter to a load terminal of said frame counter, and outputting a timing signal for performing a flywheel operation on the basis of a clock signal thereof when the frame synchronization is not established; and a baseband circuit for decoding and operating baseband signals from said frame synchronizing circuit in synchronism with timing signals from said frame counter circuit, converting the baseband signals in the frame according to a frame format, receiving data which are input from an external circuit, processing the baseband signals according to the data from the external circuit, and outputting the processed baseband signal.

3. The reception circuit as claimed in claim 1 or 2, wherein said frame counter circuit includes means for detecting on the basis of the frame status signal whether the frame synchronization is established, means for generating a timing signal on the basis of the frame pulse at the synchronization time and means for operating the frame counter in a flywheel mode at the non-synchronization time.

4. The reception circuit as claimed in claim 1, wherein said interface buffer converts the format of data from an external circuit and outputs the format-converted data to said baseband circuit.

5. The reception circuit as claimed in claim 1, wherein said baseband circuit comprises a descrambler for descrambling scrambled baseband signals.

6. The receiving method as claimed in either claim 1 or 2, wherein said received signals arrive from said external sources and are demodulated into said baseband signals which contain frame signals; and means wherein data from said signals received from an external circuit are converted in format in order to convert the baseband data to desired format data.

7. The reception circuit as claimed in claim 1, wherein said interface buffer converts the format of data from an external circuit and outputs the format-converted data to said baseband circuit.

8. The reception circuit as claimed in either claim 1 or 2, wherein said baseband circuit comprises a descrambler for descrambling scrambled baseband signals.

* * * * *